(12) United States Patent
Tarditi

(10) Patent No.: US 6,925,639 B2
(45) Date of Patent: Aug. 2, 2005

(54) METHOD AND SYSTEM FOR REGISTER ALLOCATION

(75) Inventor: David R. Tarditi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 09/792,395

(22) Filed: Feb. 23, 2001

(65) Prior Publication Data

US 2002/0170044 A1 Nov. 14, 2002

(51) Int. Cl.⁷ .............................................. G06F 9/45
(52) U.S. Cl. ...................... 717/159; 717/153; 717/154
(58) Field of Search ................................. 717/140–161

(56) References Cited

U.S. PATENT DOCUMENTS 6,625,723 B1 * 9/2003 Jourday et al. ............. 712/217

FOREIGN PATENT DOCUMENTS

EP 428084 A2 * 5/1991 ............. G06F/9/45

OTHER PUBLICATIONS

Lueh et al, "Call–cost directed register allocation", ACM, pp. 296–307, 1997.*

Chaitin, G. et al., "Register Allocation Via Coloring;" *Computer Languages* 6:1 (Jan. 1981), pp. 47–57.

Chaitin, G., "Register Allocation & Spilling Via Graph Coloring;" *Proceedings of the ACM SIGPLAN '82 Symposium on Compiler Construction*, Jun. 1982, pp. 98–105.

Chow, F. et al., "Register Allocation by Priority–Based Coloring;" *Proceedings of the ACM SIGPLAN '84 Symposium on Compiler Construction*, Jun. 1984, pp. 222–232.

Larus, J. et al., "Register Allocation in the SPUR Lisp Compiler;" *Proceedings of the ACM SIGPLAN '86 Conference on Compiler Construction*, Jul. 1986, pp. 255–263.

(Continued)

*Primary Examiner*—Antony Nguyen-Ba
*Assistant Examiner*—Ted T. Vo
(74) *Attorney, Agent, or Firm*—Timothy P. Sullivan; Merchant & Gould

(57) ABSTRACT

A method, system, and apparatus for inserting spill code optimized for a complex instruction set computing (CISC) two-address machine, such as a machine utilizing an 80x86 processor is described. The spill code is generated in a single pass. Copy propagation and dead-code elimination are performed to remove unnecessary loads and stores from the stack. Instructions contained within the code block are processed in reverse order. Temporary variables are not extended to the point that they may become spilled by a register allocation procedure. A store to a stack location is inserted if the stack location is not dead, saving the use of a register. Memory operands are substituted when possible in place of load and store instructions on CISC machines.

7 Claims, 11 Drawing Sheets

OTHER PUBLICATIONS

Bernstein, D. et al., "Spill Code Minimization Techniques for Optimizing Compilers;" *Proceedings of the SIGPLAN '89 Conference on Programming Language Design and Implementation*, Jun. 1989, pp. 258–263.

Chow, F. et al., "The Priority–Based Coloring Approach to Register Allocation;" *ACM Transactions on Programming Languages and Systems 12*:4 (Oct. 1990), pp. 501–536.

Callahan, D. et al., "Register Allocation Via Hierarchical Graph Coloring;" *Proceedings of the ACM SIGPLAN '91 Conference on Programming Language Design and Implementation*, Jun. 1991, pp. 192–203.

Briggs, P., "Register Allocation Via Graph Coloring;" PhD thesis, Rice University, Apr. 1992.

Briggs, P. et al., "Improvements to Graph Coloring Register Allocation;" *ACM Transactions on Programming Languages and Systems 16*:3 (May 1994), pp. 428–455.

Bergner, P. et al., "Spill Code Minimization Via Interference Region Spilling;"*Proceedings of the SIGPLAN '97 Conference on Programming Language Design and Implementation*, May 1997, pp. 287–295.

Lueh, G. et al., "Call–Cost Directed Register Allocation;" *Proceedings of the SIGPLAN '97 Conference on Programming Language Design and Implementation*, May 1997, pp. 296–307.

Fitzgerald, R. et al., "Marmot: An Optimizing Compiler for Java;" *Software: Practice and Experience 30*:3 (2000), pp. 199–232.

\* cited by examiner

METHOD AND SYSTEM FOR REGISTER ALLOCATION

FIELD OF THE INVENTION

The present invention relates generally to computer software, and more particularly to inserting spill code.

BACKGROUND

Processors have a limited number of hardware registers to use when executing instructions. In cases where there are not enough registers to hold all program variables currently in use some of the variables used by the instructions may be "spilled" into memory to free registers. When a variable is spilled, a compiler creates spill code that is inserted into the low-level code created by the compiler to manage these spilled variables. Selecting how to spill variables depends on many different factors, including machine architecture, complexity of program, and compiler efficiency. For example, RISC machines generally have many more hardware registers as compared with CISC machines making efficient spill code much less important on the RISC machines.

Generally, the need for registers increases with the complexity of programs. This complexity, in turn, creates more spilled variables and low-level spill code. Memory operations, however, are generally significantly slower than register accesses causing the program instructions that include spill code to run slower. In order to help alleviate the register pressure created by an excess of variables over available registers, various register allocation methods have been developed to determine which variables to spill.

Some of these allocation methods are widely used in optimizing compilers. One such method is a graph-coloring register allocation method known as a Chaitin-style allocation method. Generally, the method constructs an interference graph for all variables used within a procedure. A color is then assigned to each available hardware register on the processor. For example, if seven hardware registers are available then seven distinct colors for coloring the graph are available. An attempt to color each node within the interference graph with a distinct color is then made. If the coloring fails, the method chooses a variable(s) from the graph to spill and spill code is generated for the spilled variables. This method is repeated until coloring of the nodes is successful.

While methods exist to allocate registers, they are not optimized for complex instruction set computing (CISC) two-address machines. Instead, the development of allocation methods has been directed to three-address reduced instruction set computing (RISC) machines.

SUMMARY

The present invention is directed at providing a system and method for inserting spill code. According to one aspect of the invention, spill code is optimized for a complex instruction set computing (CISC) two-address machine, such as a machine utilizing an 80x86 processor.

In another aspect of the invention, the spill code is inserted in a single pass. A single pass algorithm decreases compile time as compared to a compiler that optimizes using multiple passes.

According to another aspect of the invention, copy propagation and dead-code elimination are performed to remove unnecessary loads from the stack and unnecessary stores to the stack.

In yet another aspect of the invention, the instructions contained within the program block are processed in reverse order.

According to yet another aspect of the invention, temporary variables are not extended to the point that they may become spilled by a register allocation procedure.

In yet another aspect, stores to stack locations for spilled variables may be inserted. A store to a stack location is inserted if the stack location is not dead. A stack location is not dead if there not a store to the stack location before the stack location is read. In this way, the stack location itself is essentially used in place of a register. A store to a stack location is also inserted in the cases where a spilled variable is alive in an exception-handling block that guards the block.

In still yet another aspect of the invention, memory operands are substituted when beneficial in place of load and store instructions on CISC machines. As the instructions are being processed, the number of places where a temporary variable associated with a spilled variable has been substituted for the spilled variable within the instructions is counted. In addition to keeping track of the number of places, the location of the last instruction where the temporary variable was substituted for the spilled variable is maintained. The number of places where the temporary variable has been substituted for the spilled variable is checked before a load is inserted into the new instructions as well as before a temporary variable is removed from use. If the temporary variable has been substituted at only one place for the spilled variable and that place can be replaced by a memory operand, then the memory location for the spilled variable is substituted in place of the temporary variable. This technique saves a load instruction within the spill code. If the memory location is substituted for the temporary variable in an instruction that also writes the memory location, the following instruction in the list of new instructions may be a store of the temporary variable to the stack. If so, this store instruction is removed. This technique saves a store instruction within the spill code.

These and various other features and advantages, which characterize the present invention, will be apparent from a reading of the following detailed description in conjunction with the associated drawings.

DETAILED DESCRIPTION

The present invention is directed at providing a system and method for inserting spill code. Spill code is intermediate code generated by a compiler to temporarily store and retrieve "spilled" variables. A "spilled" variable is a variable that is stored temporarily in memory outside of a hardware register until needed by a program. A register allocation procedure identifies variables within the program to spill.

Figure 1:
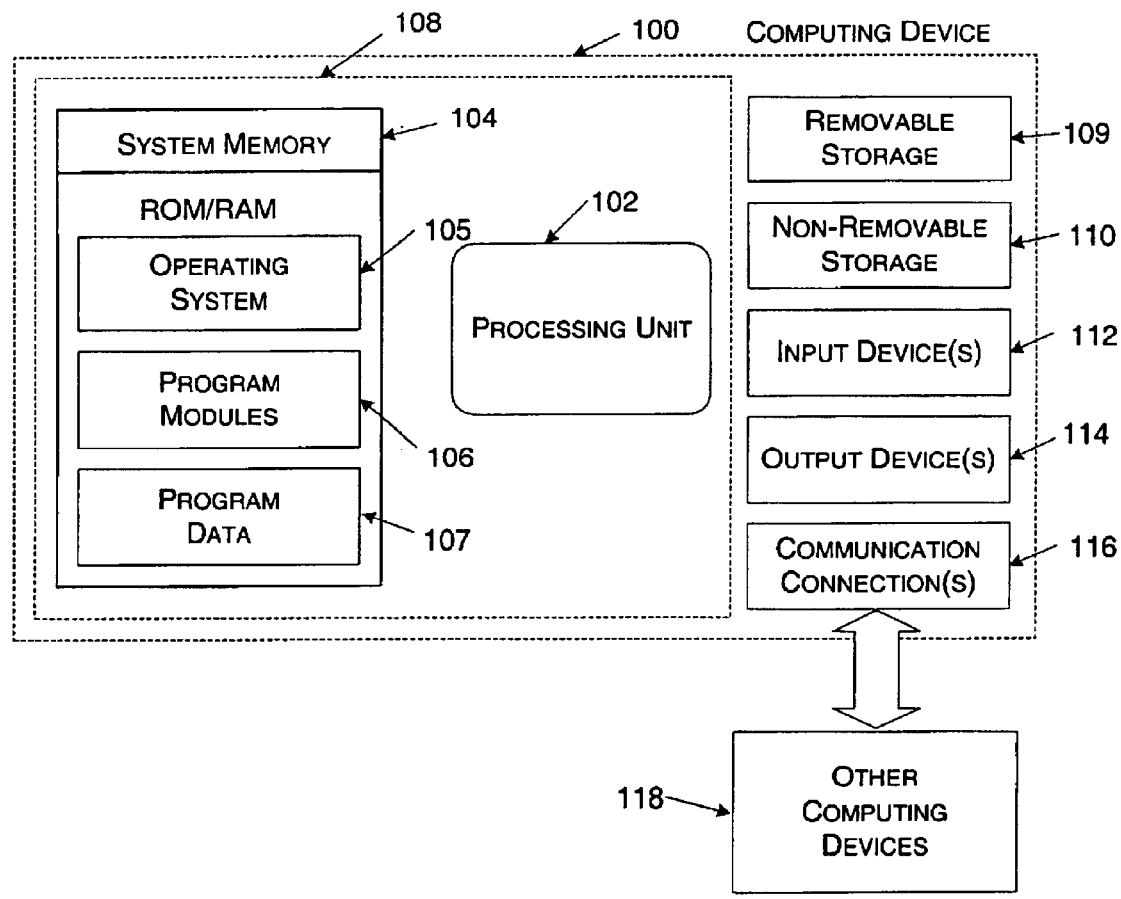
FIG. 1 is a functional block diagram of one computing device adapted to implement one embodiment of the invention.

Referring to FIG. 1, an exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
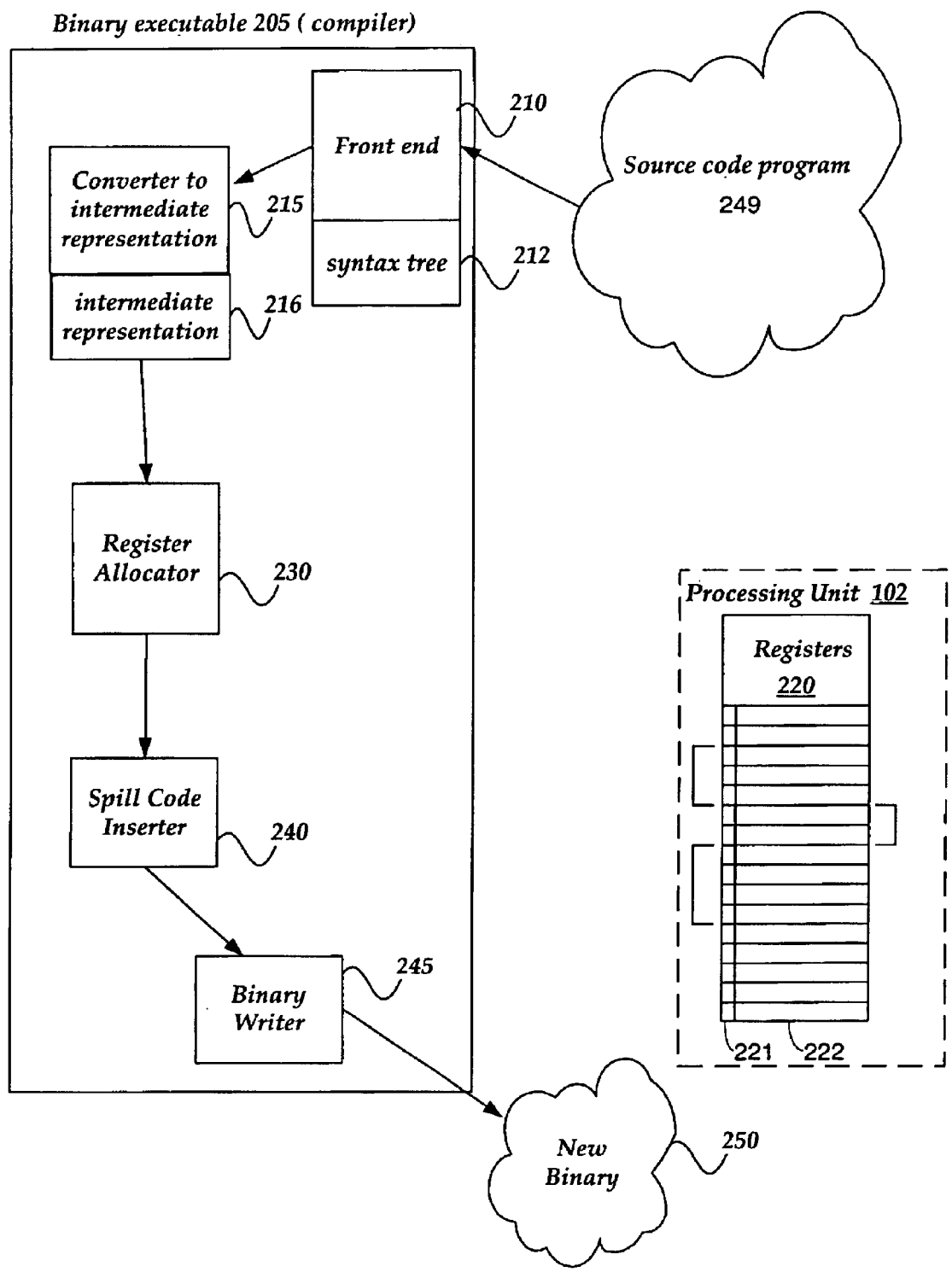
FIG. 2 is a functional block diagram illustrating a system adapted to insert spill code, according to one embodiment of the invention.

FIG. 2 is a functional block diagram illustrating several components according to the present invention. This embodiment of the invention includes a processing unit 102 having registers 220, a binary executable 205 that includes a front-end 210, a converter to intermediate program representation 215, an intermediate program representation 216, register allocator 230, spill code inserter 240, and binary writer 245, a source program 249, and a new binary executable 250.

Processing unit 102 operates as described in conjunction with FIG. 1. Processing unit 102 includes registers 220. Generally, a register is a set of bits of high-speed memory within a microprocessor or other electronic device, used to hold data for a particular purpose. Each register in a central processing unit is referred to in assembly language programs by a name such as AX (the register that contains the results of arithmetic operations in an Intel 80x86 processor) or SP (the register that contains the memory address of the top of the stack in various processors). The number of individual registers is limited according to computing device 100. A register configuration similar to the one shown in registers 220 may be used.

Processing unit 102 runs binary executable 205. Binary executable 205 is an example of a compiler. The front-end 210 reads source code program 249 and converts it to a syntax tree 212. The converter to intermediate program representation 215 converts each procedure represented in the syntax tree to an intermediate program representation 216. The intermediate program representation 216 consists of a code block that is a list of assembly language instructions and other data representing the procedure.

Register allocator 230 is configured to receive the intermediate program representation 216 for the procedure. Register allocator 230 generates a list of variables to spill based on the code block and available number of registers. It then sends this information to spill code inserter 240.

Spill code inserter 240 is configured to receive register allocation information. For example, the register allocation may be provided by a graph-coloring register allocation method. One particular example is a Chaitin-style allocator as is well known in the art. After spill code inserter 240 receives allocation information, it rewrites the intermediate representation 216 for the procedure to insert spill code to handle the variables for which there are not available hardware registers. Execution then returns to register allocator 230.

If no variables need to be spilled, register allocator modifies the intermediate representation 216 for the procedure to replace all variables with the appropriate register names. It then passes the intermediate representation to binary writer 245. Binary writer 245 writes binary executable 250, which may be stored in RAM, on disk, or in some other suitable computer readable memory.

Figure 3:
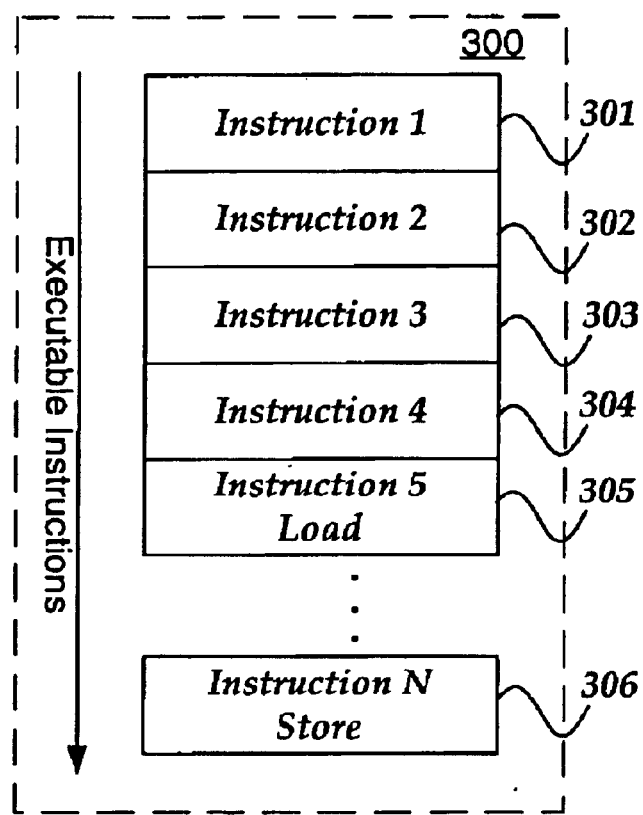
FIG. 3 illustrates a diagram showing a register holding exemplary instructions, according to one embodiment of the invention.

FIG. 3 illustrates instructions contained in intermediate representation 216. Instructions 301 through 306 in FIG. 3 are for illustrative purposes only. The instructions contained in code block 300 may contain any sequence of instructions executable on a processor. A processor includes physical processors already constructed, those in design, multiple processors acting together, virtual processors, and any other device capable of interpreting intermediate representation 216'sinstructions. According to one embodiment of the invention, the instructions are for a two-address CISC machine, such as a machine utilizing an 80x86 processor.

Figure 4:
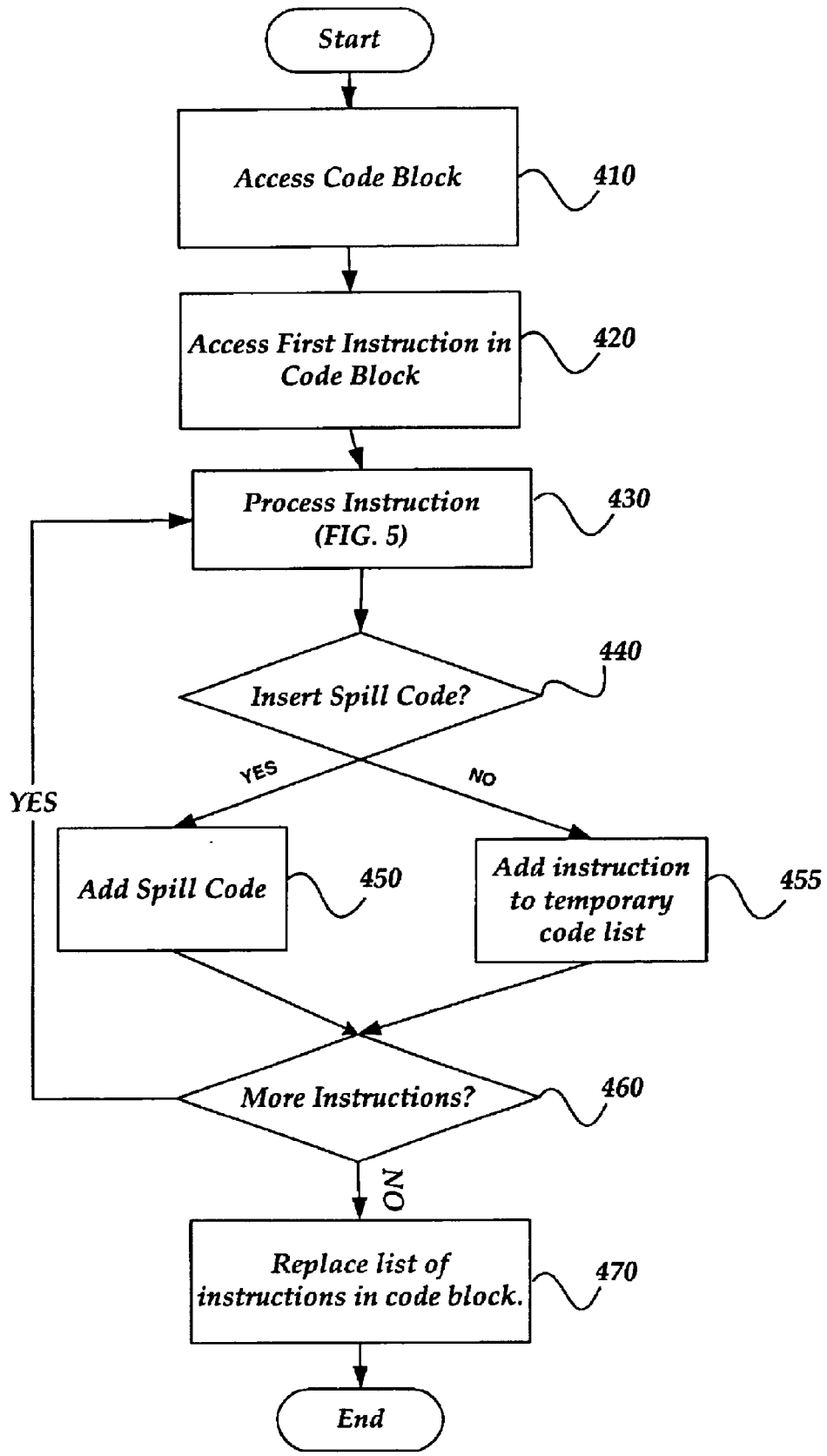
FIG. 4 is an overview flowchart illustrating inserting spill code.

FIG. 4 is an overview flow diagram illustrating a method for inserting spill code. Starting at block 410, a code block is accessed. According to one embodiment of the invention, a compiler accesses the code block. A code block is a list of instructions contained within an intermediate representation program. The code block may be the entire list of instructions for a program, a single procedure within a program, a group of procedures, or any number of instructions contained within the program.

Moving to block 420, the first instruction within the code block is accessed. According to one embodiment of the invention, the instructions are processed in reverse order. Therefore, according to this particular embodiment, the first instruction is actually the last instruction within the code block. Processing the instructions in reverse order allows the spill code inserter to easily track the number of uses of the variables throughout the code block as well as determine if variables are live or dead after the instructions have been processed. Additionally, the reverse processing helps to avoid the use of temporary variables.

Figure 5:
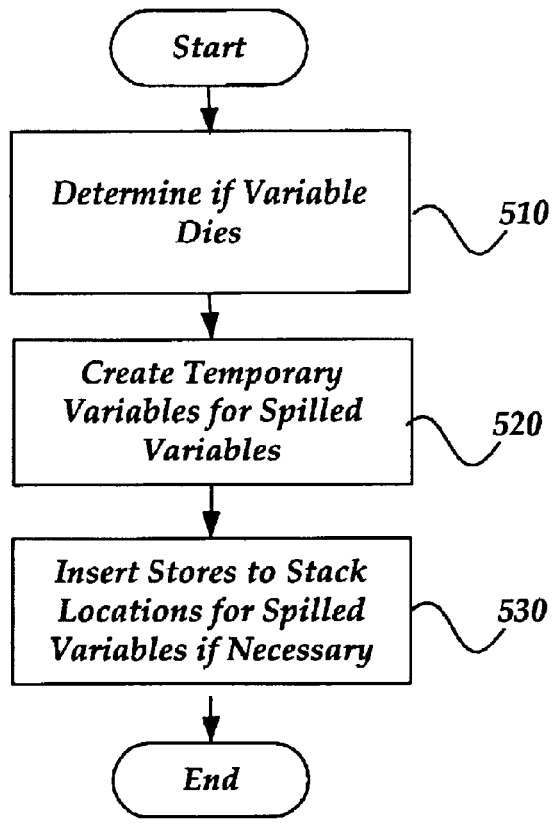
FIG. 5 is an overview flowchart illustrating processing instructions within a code block, according to one embodiment of the invention.
Figure 6:
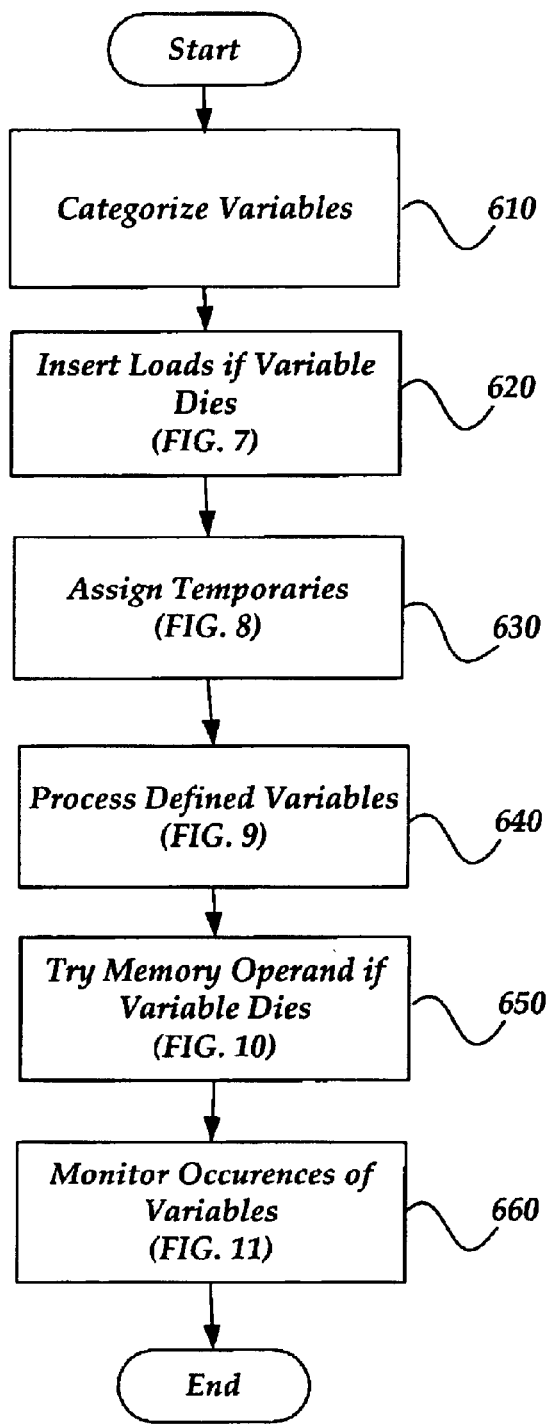
FIG. 6 is a flowchart illustrating another process for inserting appropriate spill code instructions within a code block.

At block 430, the instruction is processed to create spill code if required (See FIGS. 5 and 6 and related discussions). Decision block 440 determines whether or not to insert spill code for the instruction being processed or modify the instruction being processed.

If no spill code is to be inserted and the instruction is not to be modified, then the instruction is simply added to a temporary list of instructions (block 455).

If spill code is to be inserted or the instruction is to be modified, then at block 450 zero or more spill code instruction are generated and these instructions are added to the temporary list of instructions. In addition, a modified copy of the instruction is also added to the temporary list of instructions. Applying a mapping from spilled variables to temporary variables modifies the instruction. For each occurrence of a spilled variable in the instruction, the mapping is consulted for a corresponding temporary variable and the temporary variable is substituted for the spilled variable. For example, if there are not enough registers to hold all variables currently in use at that point in the program, some of the variables in use may be "spilled" into memory and stored there.

In one particular embodiment, the spill code is optimized for a complex instruction set computing (CISC) machine, such as a machine utilizing an 80x86 processor. Additionally, the spill code generated is optimized for a two-address machine.

Decision block 460 determines if there are any more instructions within the code block. If so, the logical flow returns to block 430. Otherwise, the code block is modified to use a copy of the temporary list of instructions (block 470).

According to one embodiment, the compiler generates the spill code in a single pass. A single pass decreases compile time as compared to a compiler that optimizes using multiple passes. It will be appreciated, however, that multiple passes may be used.

FIG. 5 is an overview flowchart illustrating processing instructions according to one embodiment of the invention. Starting at block 510, a determination is made as to whether a variable dies after the instruction being processed. A variable dies if the code block no longer uses the current value of the variable after the instruction has executed. If a variable dies, spill code may be generated.

At block 520, temporary variables are created for each spilled variable depending on the use of the variables in the instruction being processed (See FIG. 6 and related discussion).

Moving to block 530, stores to stack locations may be inserted for spilled variables defined by the instruction. For example, a store may be inserted if a variable within the instruction is alive in an exception handler guarding the block.

FIG. 6 is a flowchart illustrating another process for inserting appropriate spill code instructions within a code block according to another embodiment of the invention. Starting at block 610, variables within the instruction being processed are categorized as used, defined, or used and defined. A variable is used if the value of the variable used during execution of the instruction. For example, variable B is used when the instruction is MULT A, B. A variable is defined if it is modified during execution of the instruction. A variable is used and defined if the value of the variable is both used and the variable is also modified during the execution of the instruction. This process keeps a map from spilled variables to temporary variables. The map is updated as appropriate.

Figure 7:
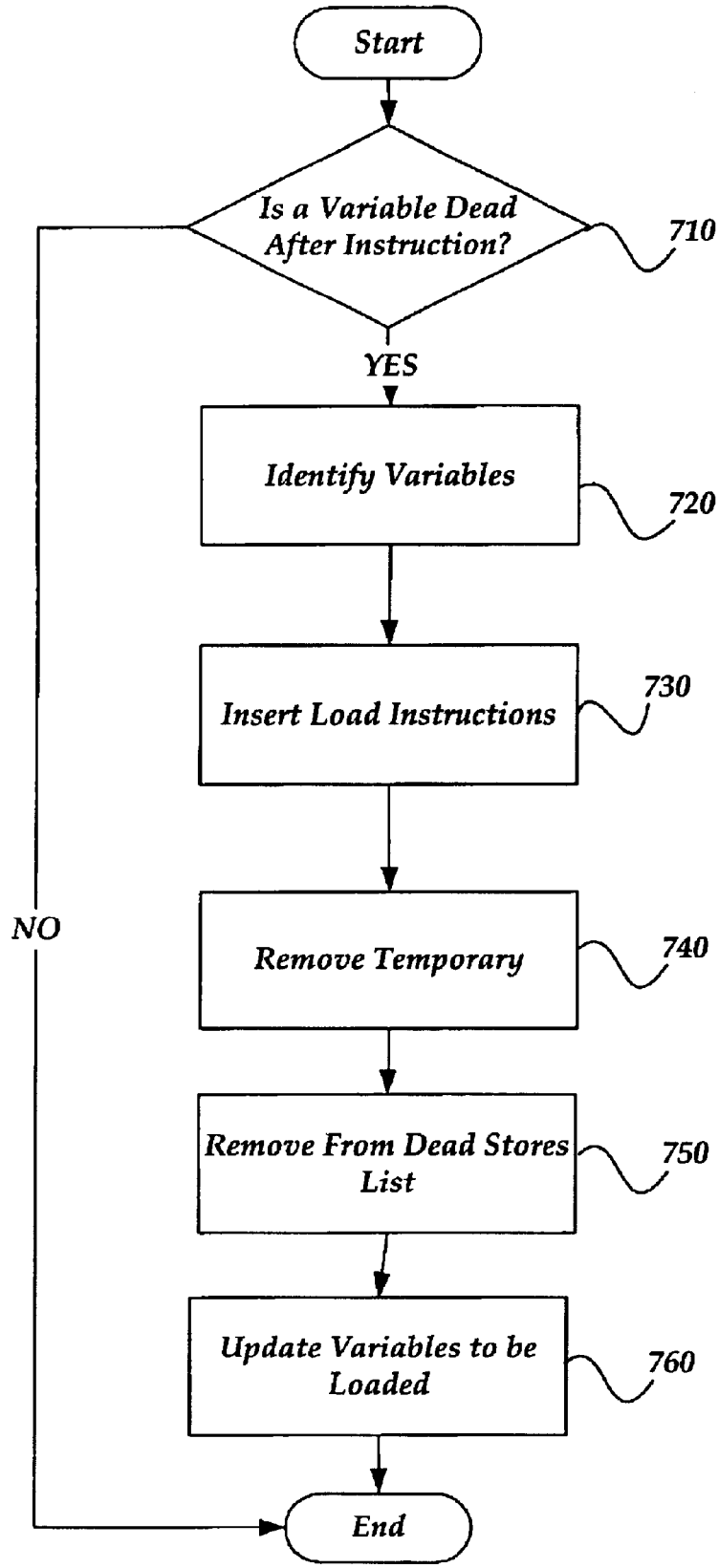
FIG. 7 is a flowchart illustrating inserting loads if a variable has died, according to one embodiment of the invention.

At block 620 loads are inserted if a variable within the instruction dies (See FIG. 7 and related discussion). A variable dies after an instruction if the value of the variable is not accessed again after the processor executes the instruction. Since the instructions are being processed in reverse order, whether a variable is live is kept track of as the instructions are processed.

Moving to block 630, spilled variables are assigned temporary variables. Temporary variables are created for any variables to be spilled that are defined or used within the instruction being processed (See FIG. 8 and related discussion), if the spilled variables do not have an entry in the mapping from spilled variables to temporary variables.

Defined variables within the instruction are processed at block 640. A determination is made whether a variable within the instruction is alive in an exception handler guarding the code block and, if not, whether the variable is not within a dead stores list (See FIG. 9 and related discussion).

Next, at block 650 the spill code may be modified if a variable used or defined by the instruction dies after the instruction. A memory operand is used in place of a load instruction and/or store instruction if appropriate (See FIG. 10 and related discussion).

Moving to block 660, the counts of the times the temporary variables have been substituted for the spilled variables within the instructions are monitored along with the last location where each temporary variable has been used in place of the spilled variable. Additionally, memory operands are used instead of a store instruction based on the occurrence counts of the temporary variables (See FIG. 10 and related discussion).

FIG. 7 is a flowchart illustrating a process for inserting loads if a variable has died. Determination block 710 determines if there is at least one variable within the instruction that is used or defined that is not alive after the instruction is executed. Processing the instructions in reverse order allows this determination to easily be made since the use of variables in later instructions is known before accessing the current instruction.

If a variable is dead after the instruction, then, at block 720, any of the variables that need to be loaded and are not defined by the instruction are identified. In one embodiment of the invention, the variables that need to be loaded from the stack are maintained in a data structure accessed by the spill code inserter 240.

Moving to block 730, for each of the identified variables, a load is inserted. According to one actual embodiment of the invention, the load is placed in a the temporary list of instructions. At block 740, the variable is removed from the mapping of spilled variables to temporaries. Next, at block 750, the variable is removed from the dead stores list ensuring that stores to the variables stack location occur.

After all identified variables are processed, the set of variables that need to be loaded are updated and all identified variables are removed from the set (block 760).

Figure 8:
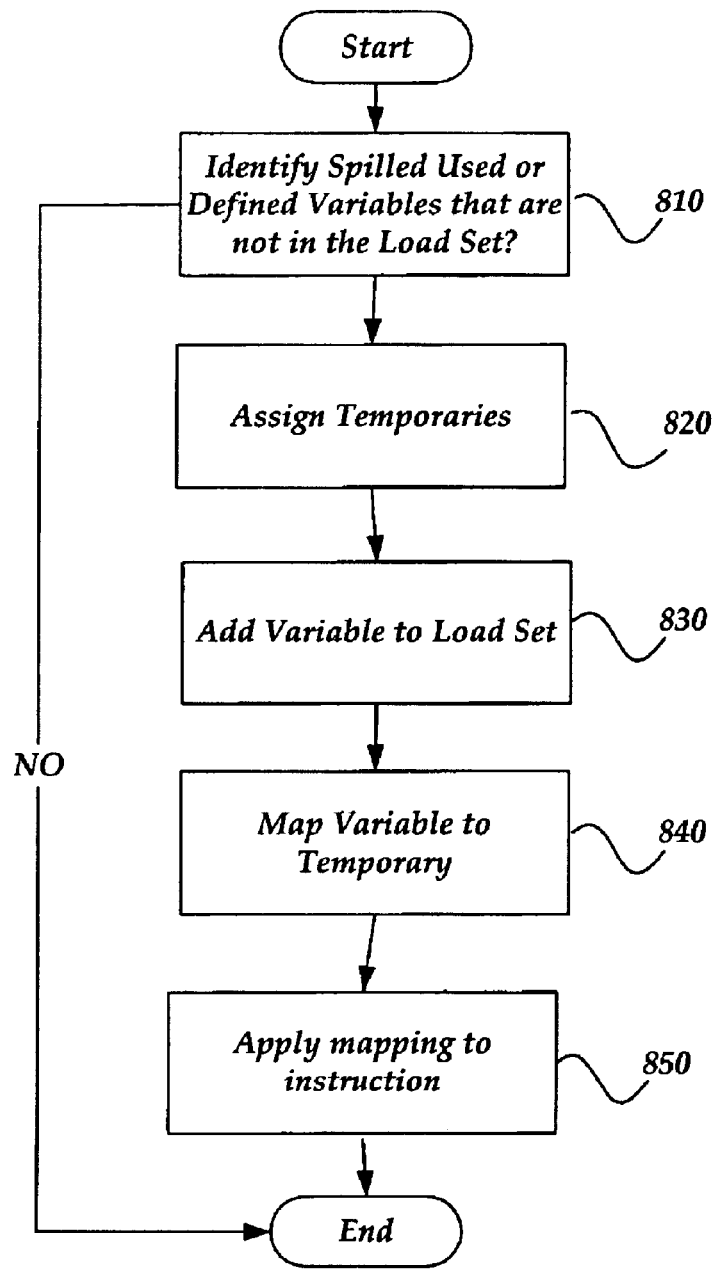
FIG. 8 is a flowchart illustrating assigning temporary variables to spilled variables, according to one embodiment of the invention.

FIG. 8 is a flowchart generally illustrating a process for assigning temporary variables to spilled variables. Determination block 810 identifies the spilled variables within the instruction that are used or defined and do not have an entry in the mapping from spilled variables to temporary variables. Such variables will also not be in the set of spilled variables that need to be loaded.

At block 820, for each identified variable a temporary variable is created. For example, if variable x is to be spilled and variable x is contained within the instruction being processed then some new variable will be created. Moving to block 830, the spilled variable is added to the set of variables that need to be loaded. Next, at block 840, the mapping from spilled variables to temporary variables is updated to map the variable to the new temporary variable. In one embodiment of the invention, the mapping is maintained in a data structure, such as an array. The mapping is then applied to the instruction being processed (block 850). For example, if variable x was mapped to temporary t1, then x is replaced with t1 for all occurrences of x within the instruction being processed.

Figure 9:
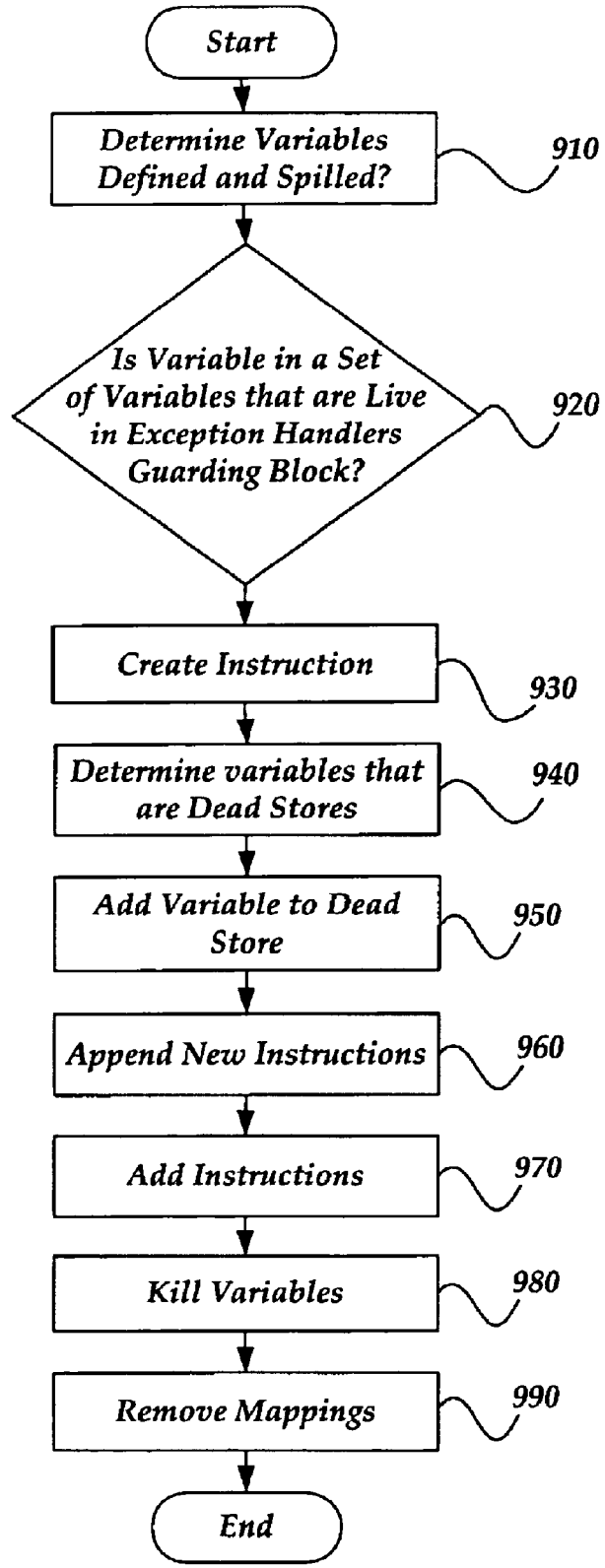
FIG. 9 is a flowchart illustrating processing defined variables that are spilled, according to one embodiment of the invention.

FIG. 9 is a flowchart illustrating processing defined variables that are spilled. Starting the logical flow, determination block 910 identifies the variables within the instruction being processed that are defined and spilled. For each identified variable, decision block 920 determines if any of the identified variables are located in exception handlers guarding the code block. For each of the variables identified by decision block 920, a store to a stack location is inserted in the cases where a spilled variable is alive in a routine that guards the block (block 930). In one embodiment, the stores to a stack location are added to the temporary list of instructions for the code block.

Determination block 940 determines the variables not in an exception handler guarding the code block but are not in the set of dead store variables. Each such variable is added to the dead stores list (block 950). The dead stores list contains the variables whose stack locations are dead. In addition, for each such variable a store to a stack location is inserted (block 960).

Moving to block 970, the new instruction (created by block 850) is added to the temporary list of instructions. Variables that are defined but not used are removed from the need to be loaded set (block 980). This prevents variables from being loaded that do not need to be loaded since they are never used. At block 990 the entries for these spilled variables are removed from the mapping from spilled variables to temporary variables.

Figure 10:
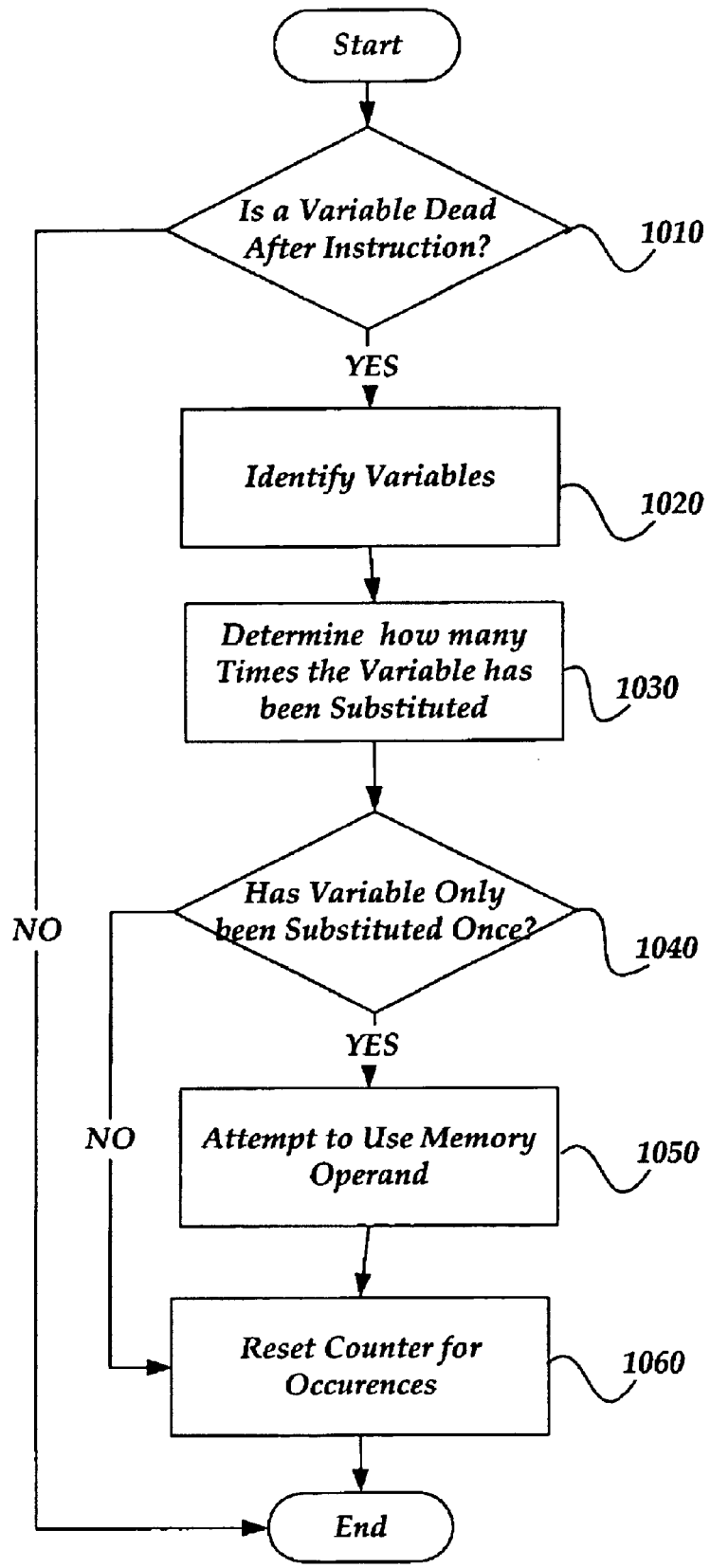
FIG. 10 is a flowchart illustrating changing the spill code inserting loads if a variable dies; according to one embodiment of the invention.

FIG. 10 is a flowchart illustrating changing the insertion of loads and stores if a variable dies (FIG. 7). If a variable dies, any associated temporary variable is removed. This prevents the temporary variable from being extended to the point that it may become spilled by a register allocation procedure. Decision block 1010 determines if there is at least one variable that is used or defined and is not alive after the instruction. If so, block 1020 determines the variables contained within the instruction that need to be loaded but are not defined by the instruction. For each of these identified variables, the following steps occur. A determination is made as to how many times the temporary variable associated with the spilled variable has been substituted in instructions for the spilled variable during processing of the code block to this point (block 1030). Decision block 1040 determines if the temporary variable has been substituted only once. If so, then a memory operand is used in place of the temporary variable (block 1050), if a memory operand is allowed. This saves a load instruction within the spill code. Otherwise the load instruction is added the temporary list of instructions. In addition, if the memory operand is defined by the instruction, a store instruction may follow the modified instruction in the temporary list of instructions. If this store instruction stores the temporary variable to the stack, it is removed, as the occurrence of the temporary variable has also been removed. This saves a store instruction in the spill code. The counter for the spilled variable that keeps track of how many times the associated temporary variable has been substituted for the spilled variable is reset to zero (block 1060).

Figure 11:
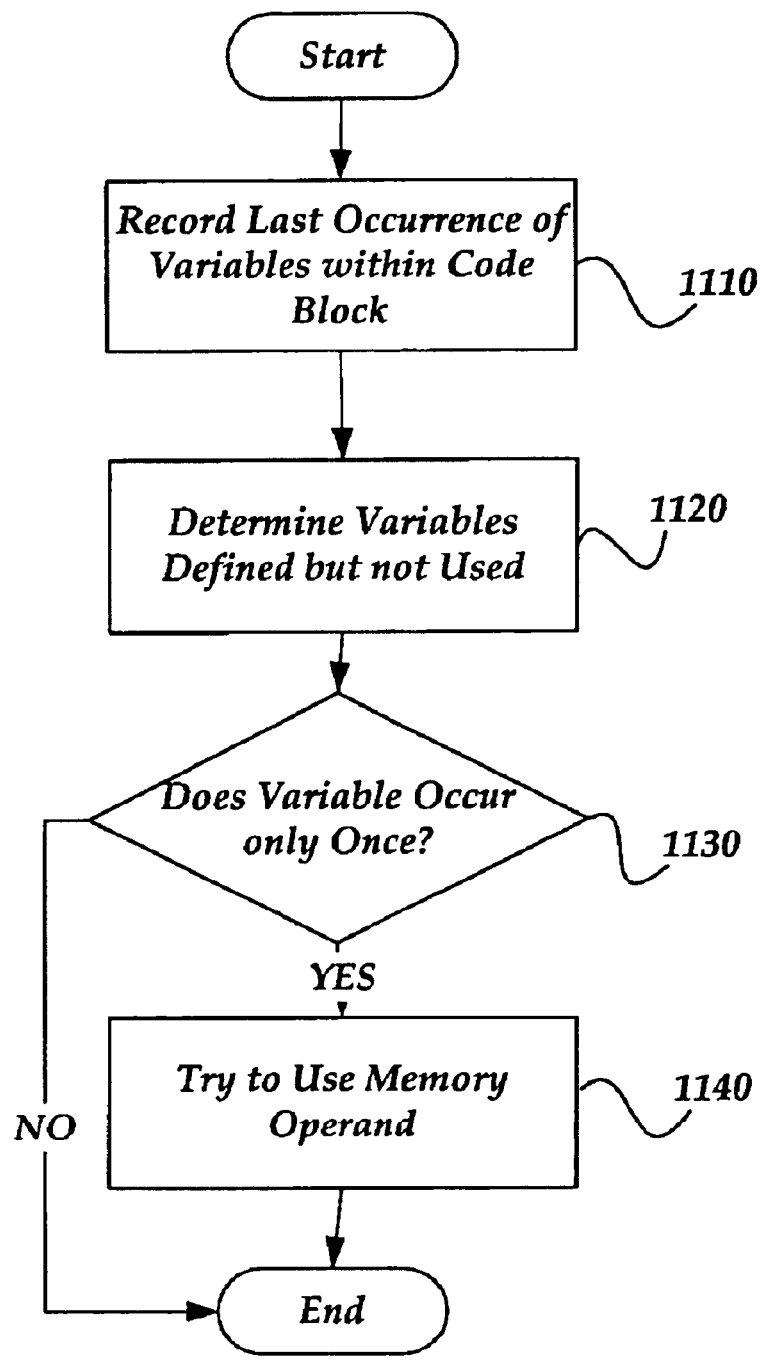
FIG. 11 is a flowchart representing updating the occurrence count of a variable, according to one embodiment of the invention.

FIG. 11 represents updating the count of places where a temporary variable has been substituted for a spilled variable. At block 1110, the count is increased by one for each occurrence of a spilled variable within the current instruction. Next, at block 1120, all spilled variables that are defined but not used are identified. At block 1130 for each identified variable a determination is made as to whether the variable occurs only one time. If so, at block 1140, a memory operand is tried in place of a store instruction. This saves a store operation within the spill code. The counter keeping track of the occurrences of the variable is reset to zero.

In one embodiment of the invention, copy propagation and dead-code elimination are performed to remove unnecessary loads and stores from the stack as is well known in the art. The method and system produce measurably faster code than generated using naïve register allocation procedures.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of inserting spill code to handle a set of spilled variables, the spilled variables being identified by a register allocation procedure, into a plurality of instructions generated by a compiler, the spill code adapted for a CISC machine having registers used when executing instructions, comprising:

(a) processing each instruction in reverse order in the plurality of instructions by:
  (i) when a variable within the instruction is dead after the instruction:
    (1) generating a spill code load instruction for each spilled variable included in a set of spilled variables to be loaded, the set of spilled variables to be loaded being a subset of the set of spilled variables;
    (2) removing all variables from the set of spilled variables to be loaded; and (3) removing all entries from a mapping from spilled variables to temporary variables;

(ii) determining if the instruction includes a variable in the set of spilled variables, and if so, for each such variable:

(1) adding an entry to the mapping from spilled variables to temporary variables; determining if the mapping maps the spilled variable to a temporary variable, and if it not, then adding the spilled variable to a set of variables that are to be loaded; creating the temporary variable; and updating the mapping from spilled variables to temporary variables to map the spilled variable to the temporary variable;

(2) generating a store instruction to store the variable to the stack location if a store to a stack location for the variable is necessary, and (iii) generating a substitute instruction by applying the mapping from spilled variables to temporary variables;

(b) generating a spill code load instruction for each variable in the set of spilled variables to be loaded;

(c) counting a number of places where the temporary variable associated with the spilled variable has been substituted for the spilled variable;

(d) tracking a location of each such temporary variable within the plurality of instructions; and (e) generating spill code based on the number of places where each temporary variable associated with the spilled variable has been substituted for the spilled variable and the location of each temporary variable; and (f) inserting the generated instructions.

2. The method of claim 1, wherein generating spill code based on the number of places where each temporary variable associated with the spilled variable has been substituted and the location of each variable, further comprises attempting to use a memory operand for each variable where the number of places where the temporary variable has been substituted for the spilled variable is one.

3. The method of claim 2, wherein if the memory operand is used in place of the temporary variable:

(a) removing any corresponding generated spill code store instructions; and (b) removing any corresponding generated spill code load instructions.

4. A computer-readable medium having computer-executable instructions for inserting spill code to handle a set of spilled variables, the spilled variables being identified by a register allocation procedure, into a plurality of instructions, the spill code adapted for a CISC machine having registers for executing instructions, comprising:

(a) processing each instruction in reverse order in the plurality of instructions by:

(i) determining if a variable within the instruction is dead after the instruction, and if so:

(1) generating a spill code load instruction for each spilled variable included in a set of spilled variables to be loaded, the set of spilled variables to be loaded being a subset of the set of spilled variables;

(2) removing all variables from the set of spilled variables to be loaded; and (3) removing all entries from a mapping from spilled variables to temporary variables;

(ii) determining if the instruction includes a variable in the set of spilled variables, and if so, for each such variable:

(1) adding an entry to a mapping from spilled variables to temporary variables and when the mapping does not already map the spilled variable to the temporary variable then adding the variable to a set of variables that are to be loaded from a stack; creating a temporary variable; and updating the mapping from spilled variables to temporary variables to map the spilled variable to the temporary variable; and (2) generating a store instruction to store the variable to the stack location if a store to a stack location for the variable is necessary, and (iii) generating a substitute instruction by applying the mapping from spilled variables to temporary variables;

(b) generating a spill code load instruction for each variable in the set of spilled variables to be loaded;

(c) counting a number of places where each temporary variable associated with the spilled variable has been substituted for the spilled variable;

(d) recording a location of the instruction where each temporary variable has been substituted for the spilled variable; and (e) inserting the generated instructions.

5. The computer-readable medium of claim 4, wherein generating the spill code instruction further comprises attempting to use a memory operand based on the number of places where an associated temporary variable has been substituted for a spilled variable.

6. The computer-readable medium of claim 5, wherein generating a spill code instruction further comprises for each temporary variable where the number of places where it has been substituted for a corresponding spilled variable is one, substituting a memory operand in place of the temporary variable to eliminate at least one of the generated load instructions or store instructions or eliminate at least one of the generated load instructions and the generated store instructions.

7. The computer-readable medium of claim 6, wherein if the memory operand is used in place of the temporary variable:

(a) removing any corresponding generated spill code store instructions; and (b) removing any corresponding generated spill code load instructions.

* * * * *